United States Patent
Kuchiki

(10) Patent No.: US 10,212,348 B2
(45) Date of Patent: Feb. 19, 2019

(54) IMAGE PROCESSING APPARATUS, ITS CONTROL METHOD, IMAGE CAPTURING APPARATUS, AND STORAGE MEDIUM

(71) Applicant: CANON KABUSHIKI KAISHA, Tokyo (JP)

(72) Inventor: Hiroaki Kuchiki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/498,944

(22) Filed: Apr. 27, 2017

(65) Prior Publication Data

US 2017/0318224 A1  Nov. 2, 2017

(30) Foreign Application Priority Data

May 2, 2016 (JP) ................. 2016-092724

(51) Int. Cl.
*H04N 5/20* (2006.01)
*G06T 5/20* (2006.01)
*H04N 5/232* (2006.01)
*G06T 5/50* (2006.01)
(Continued)

(52) U.S. Cl.
CPC .......... *H04N 5/23287* (2013.01); *G06T 5/20* (2013.01); *H04N 5/23222* (2013.01); *H04N 5/23251* (2013.01); *H04N 5/23254* (2013.01); *H04N 5/23258* (2013.01); *H04N 5/23293* (2013.01)

(58) Field of Classification Search
CPC .......... H04N 5/23287; H04N 5/23293; H04N 5/23222; H04N 5/23251; H04N 5/23254; H04N 5/23258; G06T 5/20; G06T 5/50; G06T 5/003; G06T 2207/22021; G06T 2207/10016

USPC ........ 348/154–155, 169–172, 208.1, 208.14, 348/222.1, 208.11, 699; 382/103, 107; 396/54, 153; 250/203.1–203.7, 339.14, 250/342

See application file for complete search history.

(56) References Cited

U.S. PATENT DOCUMENTS

| | | | |
|---|---|---|---|
| 7,916,177 B2 * | 3/2011 | Motomura ............. | H04N 5/228 348/208.4 |
| 8,228,390 B2 * | 7/2012 | Okada ................ | H04N 5/23248 348/208.1 |
| 9,781,346 B2 * | 10/2017 | Abe ................... | H04N 5/23287 |

(Continued)

FOREIGN PATENT DOCUMENTS

JP  2006-317848 A  11/2006

*Primary Examiner* — Marly S Camargo
(74) *Attorney, Agent, or Firm* — Cowan, Liebowitz & Latman, P.C.

(57) ABSTRACT

An image stabilization apparatus used in an image capturing apparatus that includes a display unit and which causes the display unit to display a still image captured by the image capturing apparatus by following a moving main object comprises a control unit configured to control the display unit so as to extract an area for the main object from an image captured by the image capturing apparatus and to display the extracted area and a calculating unit configured to calculate a motion of the main object based on a blur detected by a first detector which detects the blur of the image capturing apparatus and a motion vector detected by a second detector which detects the motion vector from the image, wherein the control unit changes the area for the main object based on the motion of the main object before the still image is captured.

18 Claims, 8 Drawing Sheets

(51) Int. Cl.
*G06T 5/00* (2006.01)
*G06T 7/20* (2017.01)

(56) References Cited

U.S. PATENT DOCUMENTS

| | | | | |
|---|---|---|---|---|
| 2005/0259888 | A1* | 11/2005 | Ozluturk | H04N 5/23248 |
| | | | | 382/260 |
| 2012/0033091 | A1* | 2/2012 | Miyasako | H04N 5/23254 |
| | | | | 348/208.1 |
| 2015/0003676 | A1* | 1/2015 | Kuchiki | G06T 7/2053 |
| | | | | 382/103 |
| 2016/0165139 | A1* | 6/2016 | Takayanagi | H04N 5/23261 |
| | | | | 348/208.4 |
| 2017/0134649 | A1* | 5/2017 | Wakamatsu | G06T 7/004 |
| 2017/0155842 | A1* | 6/2017 | Takayanagi | G06T 5/003 |

\* cited by examiner

IMAGE PROCESSING APPARATUS, ITS CONTROL METHOD, IMAGE CAPTURING APPARATUS, AND STORAGE MEDIUM

BACKGROUND OF THE INVENTION

Field of the Invention

The present invention relates to an image stabilization apparatus provided in a camera or the like and its control method, and more particularly to an assist technology for assisting a user in a follow shot.

Description of the Related Art

A follow shot with a camera is a technique to capture an image of an object (moving object) with a slower shutter speed than that in a normal use of the camera while the camera follows the object. This technique provides an image in which the object stands still and the background streams. A photographer (user) can capture an image full of a sense of speed by the follow shot. The follow shot, however, requires a skillful technique in matching an object velocity with a panning velocity of the camera during an exposure time period due to the slower shutter speed.

For an easy use of the follow shot, Japanese Patent Laid-Open No. ("JP") 2006-317848 discloses a method for detecting a difference between an object velocity and the panning velocity of the camera and for correcting an amount corresponding to the difference with a use of a manual blur correction function (hereinafter referred to as "follow shot assist mode"). Just before an image of the object is captured, an angular velocity sensor provided in the camera detects an angular velocity in the panning of the camera tracking the object. Simultaneously, a moving amount of the object on an image capturing plane is detected. An angular velocity of the object is calculated based on the detected panning angular velocity and the detected moving amount of the object on the image capturing plane. Then, during the exposure, an image stabilizing correction is performed based on a difference amount between the calculated angular velocity of the object and an output from the angular velocity sensor in the camera. As a result, an image blur of the object which is a target of the follow shot can be suppressed because the image stabilizing correction corrects the difference between the object angular velocity and the panning angular velocity and a manual blur amount.

However, the conventional technique disclosed in JP 2006-317848 stops a manual blur correction function before a main image capturing so as to accurately detect the moving amount of the object on the image capturing plane. For this reason, it is difficult to stabilize the object in an angle of field due to the manual blur especially in a lens having a long focal length. Moreover, when the object velocity is not matched with the panning velocity of the camera, the object moves in the angle of field (hereinafter referred to as "object blur"). As a result, it is likely that the user misses a photo opportunity.

SUMMARY OF THE INVENTION

The present invention provides an image stabilization apparatus which can correct a manual blur and an object blur in a follow shot assist mode and provide a user with an assist effect that the user can stably follow the object in an image. In addition, the present invention provides an image capturing apparatus provided with the image stabilization apparatus, a control method of the image stabilization apparatus, and storage medium.

Furthermore, the present invention provides a higher assist effect by showing the user a correction amount.

An image stabilization apparatus according to one aspect of the present invention is used in an image capturing apparatus that includes a display unit and which causes the display unit to display a still image captured by the image capturing apparatus by following a moving main object. The image stabilization apparatus comprises: one or more processors; and a memory storing instructions which, when executed by the one or more processors, cause the image stabilizing apparatus to function as: a control unit configured to control the display unit so as to extract an area for the main object from an image captured by the image capturing apparatus and to display the extracted area; and a calculating unit configured to calculate a motion of the main object based on a blur detected by a first detector which detects the blur of the image capturing apparatus and a motion vector detected by a second detector which detects the motion vector from the image, wherein the control unit changes the area for the main object based on the motion of the main object before the still image is captured.

Further features of the present invention will become apparent from the following description of exemplary embodiments with reference to the attached drawings.

DESCRIPTION OF THE EMBODIMENTS

A detailed description will be given of embodiments of the present invention, with reference to the accompanying drawings.

First Embodiment

Figure 1:
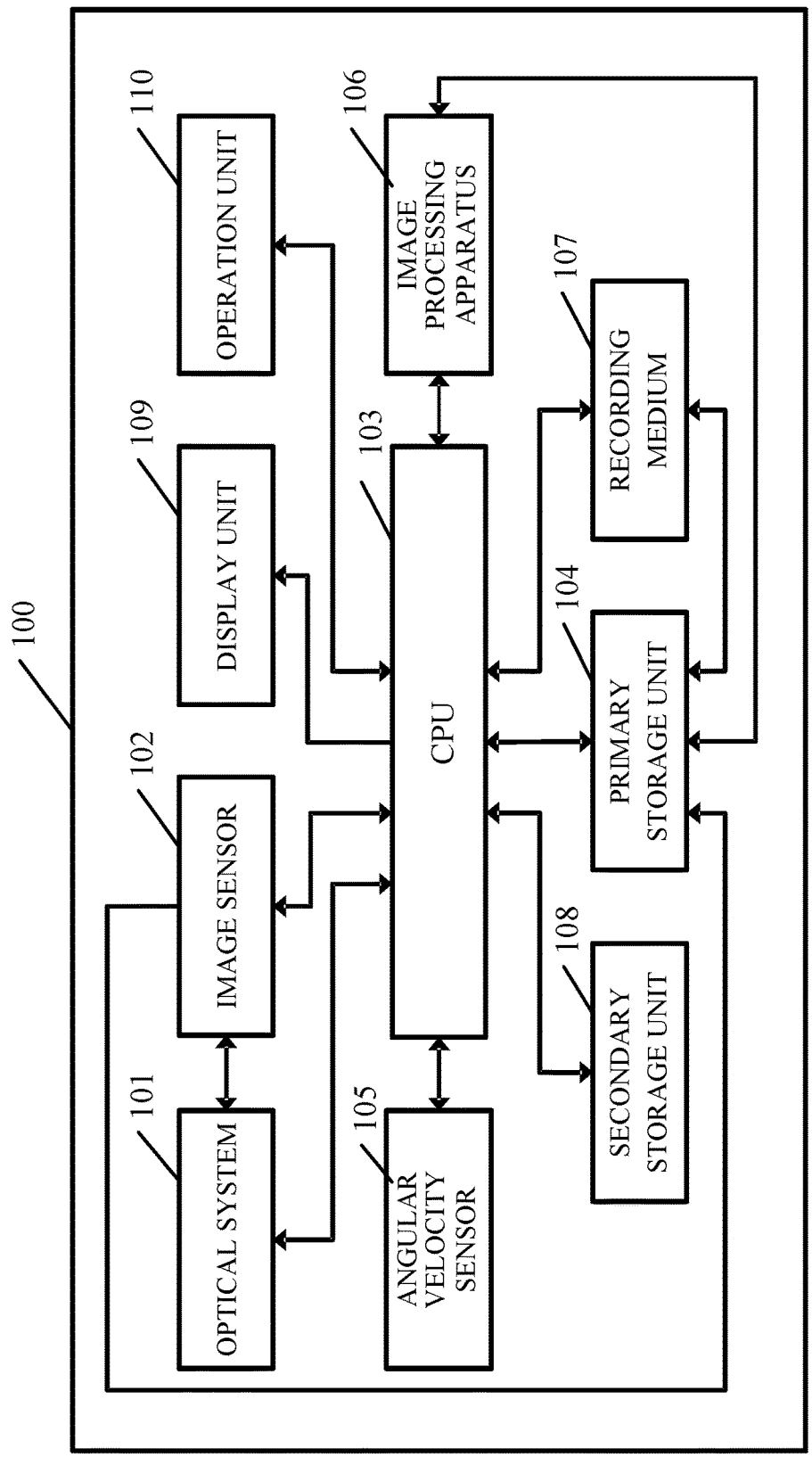
FIG. 1 is a block configuration diagram of an image capturing apparatus common to embodiments of the present invention.

FIG. 1 is a block diagram illustrating a basic configuration of an image capturing apparatus 100 as an illustrative image stabilization apparatus according to a first embodiment.

The image capturing apparatus 100 may be an arbitrary optical electrical apparatus having a camera function, such as a cellular phone having a camera function and a computer having a camera as well as a camera such as a digital camera and a digital video camera. An optical system 101 includes a lens, a shutter, and an aperture stop, and moves light emitted from an object to an arbitrary position under the control of a CPU 103 as a control unit so as to image the object on an image sensor 102. The image sensor 102, such as a CCD image sensor and a CMOS image sensor, converts the light that has passed through the optical system 101 and been imaged into an image signal.

An angular velocity sensor (first detector) 105, such as a gyro sensor, detects an angular velocity representing a moving amount of the image capturing apparatus 100, converts it into an electrical signal, and sends the electrical signal to the CPU 103. The CPU 103 realizes a function of the image capturing apparatus 100 by controlling each part of the image capturing apparatus 100 in accordance with an inputted signal or a pre-stored program. A primary storage unit 104, which is a volatile apparatus such as a RAM, stores temporal data and is used for work of the CPU 103. Information stored in the primary storage unit 104 is used for an image processor 106 and recorded in a recording medium 107. A secondary storage unit 108, which is a non-volatile storage unit such as an EEPROM, stores a program (firmware) and a variety of types of setting information for controlling the image capturing apparatus 100 and is used by the CPU 103.

The recording medium 107 records data of images obtained by image capturing and stored in the primary storage apparatus 104. The recording medium 107 is detachable from the image capturing apparatus 100 as a semiconductor memory card and the recorded data is read out of the recording medium 107 installed in a personal computer or the like. That is, the image capturing apparatus 100 has an insertion/ejection mechanism of the recording medium 107 and a read/write function. A display unit 109 displays a viewfinder image in the image capturing, a captured image, and a GUI image for a dialogical operation. An operation unit 110 includes input devices which accept operations from a user and sends input information to the CPU 103, such as an input device using a voice or visual axis of a user as well as a button, a lever, a touch panel.

The image capturing apparatus 100 according to the first embodiment has a plurality of image processing patterns which the image processor 106 applies to the captured image, and the pattern is settable as an image capturing mode from the operation unit 110. The image processor 106 performs not only the image process called as a so-called development process but also a color tone adjustment depending on an image capturing mode. At least one part of functions of the image processor 106 may be realized via a software by the CPU 103.

The image stabilization apparatus according to the present invention includes at least the CPU 103, the angular velocity sensor 105, and the image processor 106 and may include other compositions.

Figure 2:
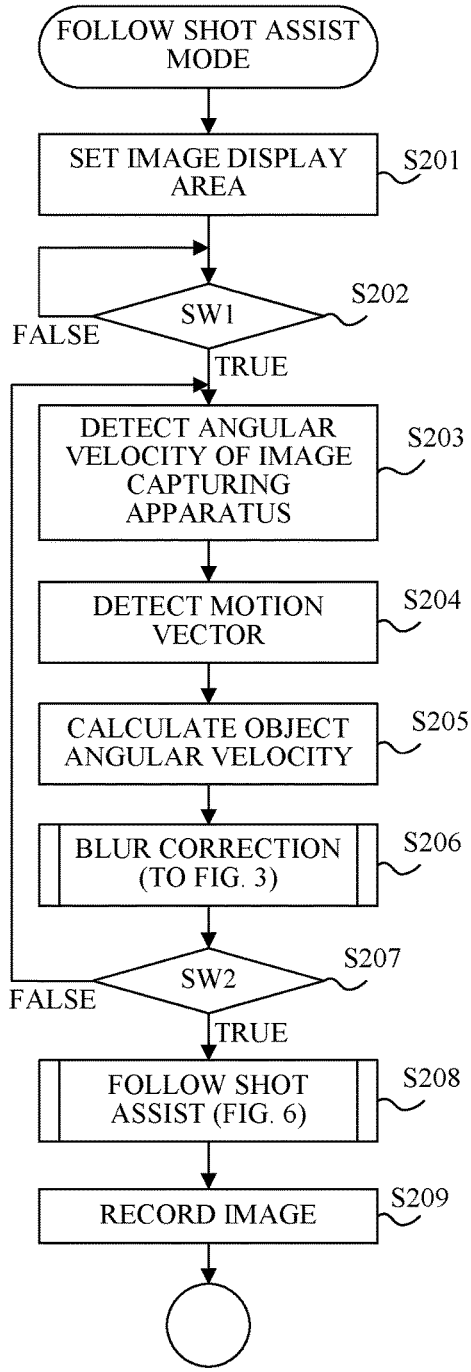
FIG. 2 is a general flowchart of a follow shot assist according to the first embodiment.

FIG. 2 is a flowchart illustrating a follow shot assist according to the first embodiment. Steps S201 to S206 represent processes performed during a preliminary action period before main image capturing.

Firstly, in the step S201, the CPU 103 restricts a display area for the image signal converted by the image sensor 102 to an area set for a blur correction in the follow shot assist, and displays the restricted area together with an area for displaying blur information on the display unit 109. In the step S202, the CPU 103 determines whether a shutter button (operation unit 110) has been half-pressed (hereinafter SW1). When the SW1 is not pressed ("false" in the step S202), the CPU 103 stands by until the SW1 is pressed.

When the SW1 is pressed ("true" in the step S202), processes proceed to the step S203 and the subsequent steps.

It is one example to proceed to the step S203 and the subsequent steps based on the SW1 input and the processes in the step S203 and the subsequent steps may be always performed based on the start of the follow shot assist mode.

In the step S203, the CPU 103 acquires an angular velocity of the image pickup apparatus 100 detected by the angular velocity sensor 105. In the step S204, the CPU 103 divides each of images which are continuously captured by the image sensor 102 into a plurality of block areas and detects a motion vector between the images with a use of the image processor 106 as a second detector. The detected motion vector is converted into a moving amount on the image capturing plane.

In the step S205, the CPU 103 as a calculating unit specifies a motion vector of the object (hereinafter referred to as an "object vector") based on the angular velocity of the image capturing apparatus 100 acquired in the step S203 and the motion vectors converted into the moving amounts on the image capturing plane in the step S204, and calculates an object angular velocity.

The motion vector includes the object vector as an object for the follow shot and the other vectors, which are vectors of the background (hereinafter referred to as "background vector"). The object angular velocity can be calculated by adding a shift amount of the object vector to the angular velocity of the image capturing apparatus 100. The object vector is specified, for example, by regarding the motion vector which corresponds to a moving amount on the image capturing plane corresponding to the angular velocity of the image capturing apparatus 100 as the background vector. Alternatively, the object vector can be specified by regarding the motion vector whose absolute value is small as the object vector. A method of specifying the object vector is not limited to the above methods and the object vector may be specified by other methods.

Assume that f[mm] is a focal length and fps[frame/sec] is an interval for acquiring images (hereinafter referred to as a "frame rate"). Then, the angular velocity ω[rad/sec] of the image capturing apparatus 100 is converted into a moving amount a[mm] on the image capturing plane between the images by using the following expression:

$$a = f \tan\left(\frac{\omega}{fps}\right) \qquad \text{EXPRESSION 1}$$

In the step S206, the CPU 103 corrects blurs by using the image processor 106 and displays a correction result and a correction amount on the display unit 109.

Referring to FIG. 2, the step S206 is a process related to the blur correction according to the first embodiment. A detailed process will be explained with reference to FIGS. 3 to 5.

Figure 3:
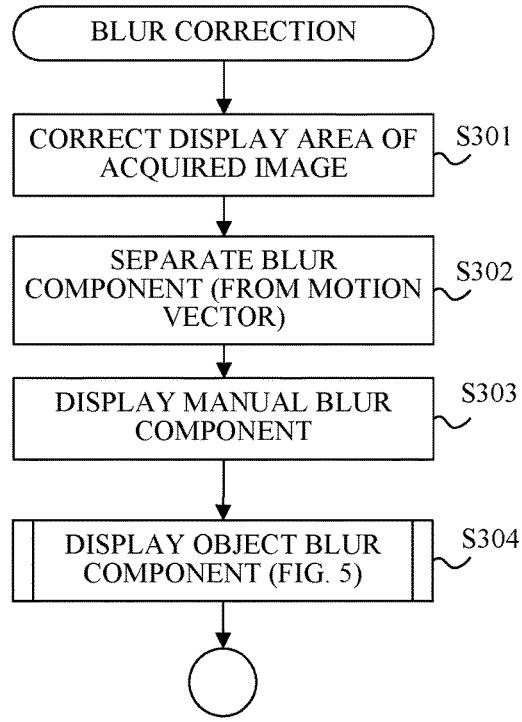
FIG. 3 is a detailed flowchart illustrating a blur correction according to the first embodiment.

FIG. 3 is a detailed flowchart illustrating the blur correction according to the first embodiment. The detailed blur correction according to the first embodiment will now be explained with reference to FIG. 3.

In the step S301, the CPU 103 moves a display area of the image signal converted by the image sensor 102 based on the object vector specified in the step S205 in FIG. 2 and displays the display area on the display unit 109. In the step S302, the CPU 103 extracts an object blur component by applying a low-pass filter (hereinafter referred to as "LPF") as a separating unit to the object vector by using the image processor 106. The CPU 103 calculates a manual blur component by calculating a difference value between the object vector and the object blur component.

In the step S303, the CPU 103 displays the manual blur component and the specified correction amount on the display unit 109. In the step S304, the CPU 103 displays the object blur component and the specified correction amount on the display unit 109.

As described above, the CPU 103 corrects the blur by moving the display area on the image capturing plane, separating blur components into the manual blur component and the object blur component, and displaying information on the manual blur component and the object blur component on the display unit 109.

Figure 4A:
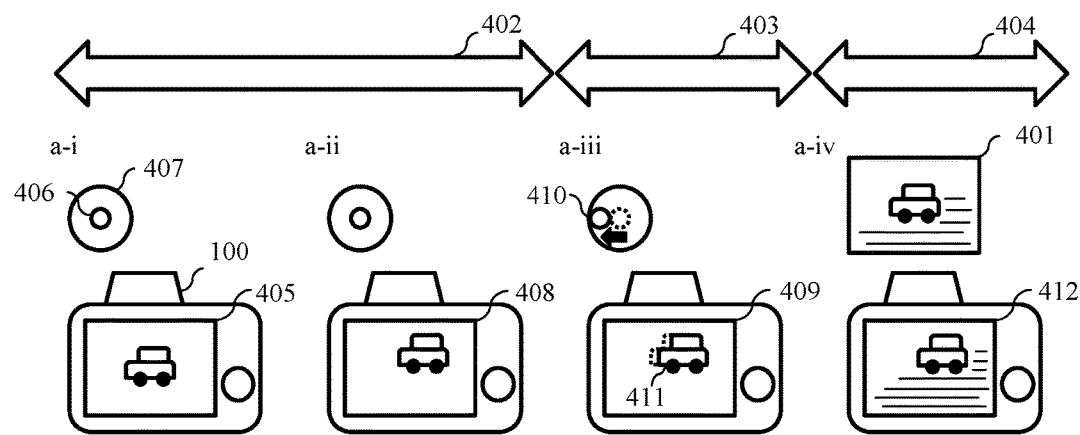
FIGS. 4A and 4B illustrate displays in a follow shot assist according to the first embodiment.
Figure 4B:
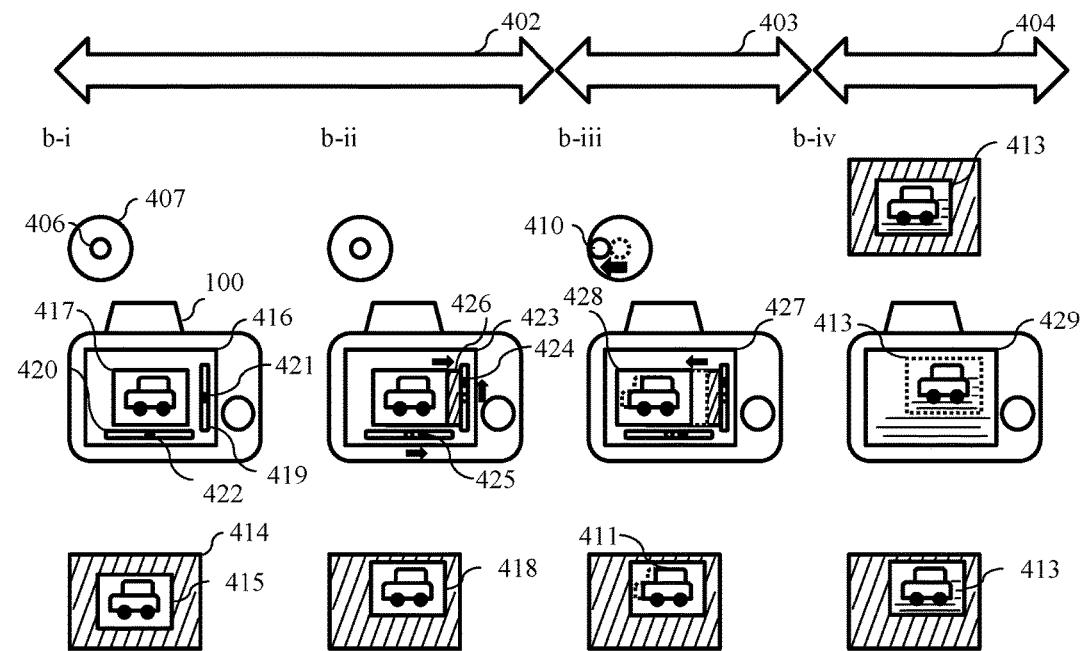

FIGS. 4A and 4B illustrate concrete displays in a follow shot assist mode according to the first embodiment. The concrete displays of the follow shot assist mode according to the first embodiment will now be explained with reference to FIGS. 4A and 4B.

FIG. 4A illustrates displays in the conventional follow shot assist mode and FIG. 4B illustrates the displays in the follow shot assist mode according to this embodiment. Reference numeral 401 denotes a target image to be captured in the conventional follow shot assist mode. The target image is determined, for example, by regarding an image when the SW1 is pressed as the target image but this is not an only method and the target image may be determined by other methods.

Reference numeral 402 denotes a preliminary action period before the SW2 is pressed and the processes of the steps S201 to S206 are performed during this preliminary action period 402.

Firstly, the display in the conventional follow shot assist mode will be explained with reference to FIG. 4A. Assume that reference numeral 401 denotes an angle of field of an image to be captured. Then, the user pans the image pickup apparatus 100 so as to obtain an angle of view illustrated by reference numeral 405. In the conventional follow shot assist mode, a position of a shift lens 406 as a corrector included in the optical system 101 is fixed at a center position of a movable range 407 in order to accurately detect the moving amount of the object image on the image capturing plane. The image signal converted by the image sensor 102 is directly displayed on the image display unit 109. As a result, as illustrated by reference numeral 408, the object position is not stable in the angle of field due to the manual blur or the object blur, and it is difficult to follow the object.

With the above problem in mind, the display in the follow shot assist mode according to this embodiment will be explained with reference to FIG. 4B. Reference numeral 413 illustrates a target image to be captured in the follow shot assist mode according to this embodiment. In the first embodiment, as illustrated in the step S201 in FIG. 2, the display area of the image is restricted for the blur correction from the whole image capturing area 414 to an area illustrated by reference numeral 415. Thus, the target image 413 corresponds to the display area 415.

Reference numeral 416 illustrates a basic display in the follow shot assist mode according to the first embodiment and it is displayed in the step S201 in FIG. 2. Reference numeral 417 illustrates an area for displaying the display area 415. In the step S301 in FIG. 3, when the display area moves with the object that moves due to the manual blur or the object blur, displaying the moved area 418 provides a blur correction effect.

Reference numeral 419 illustrates a gauge of a manual blur correction amount in a PITCH direction and reference numeral 420 illustrates that in a YAW direction. Marks 421 and 422 provide the manual blur correction amounts in the PITCH and YAW directions, respectively. Reference numeral 423 illustrates the display related to the blur correction according to this embodiment and it is displayed in the step S206 in FIG. 2.

In the step S303 in FIG. 3, the manual blur correction amount is illustrated by moving the marks 421 and 422 as illustrated by reference numerals 424 and 425, respectively based on an output of the manual blur component specified in the step S302. In the step S304, the object blur correction amount is illustrated by moving a rectangular area 426 based on an output of the object blur component extracted in the step S302. This is the concrete displays in the preliminary action period 402.

Figure 5:
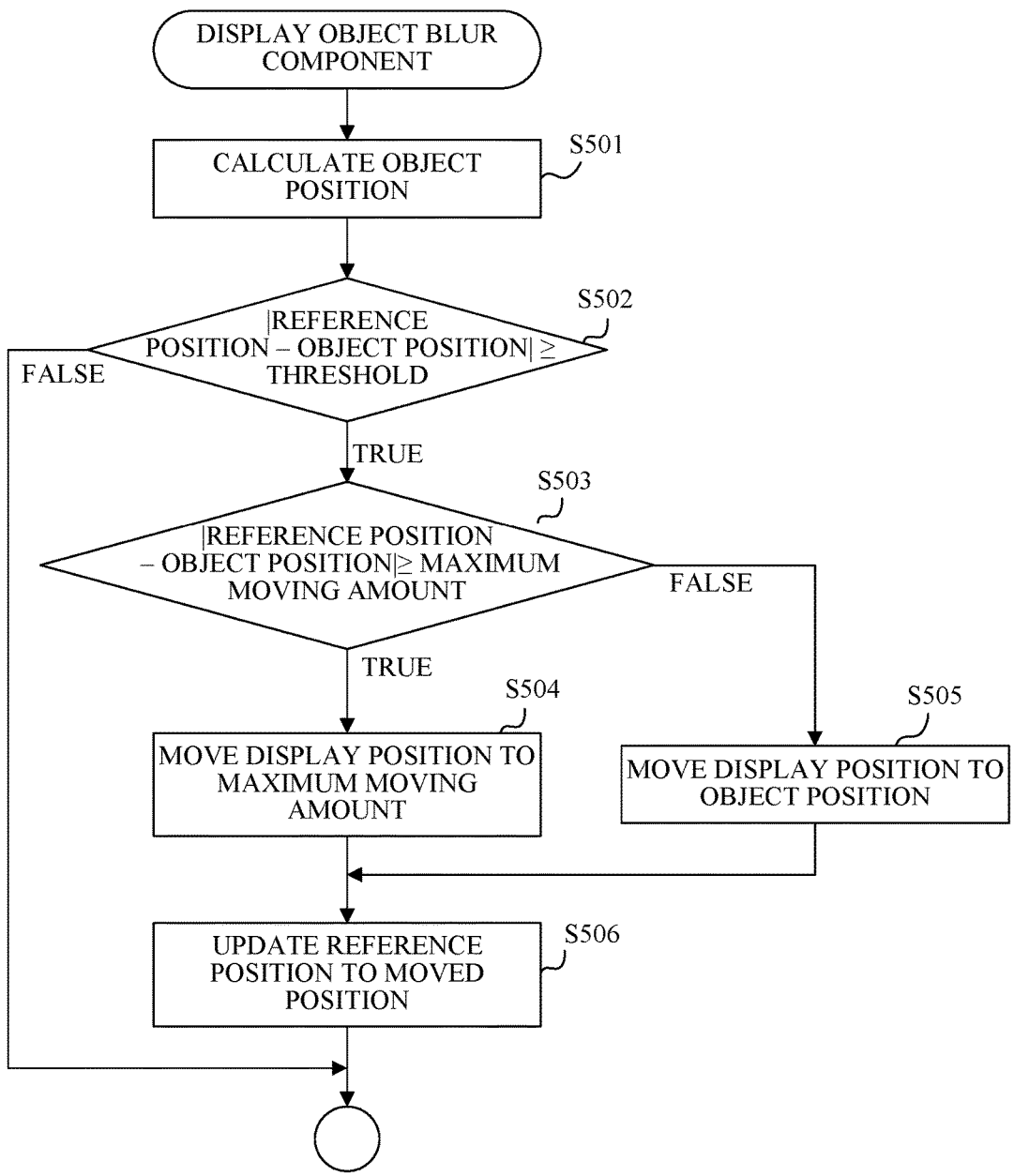
FIG. 5 is a flowchart of a display process for an object blur component according to the first embodiment.

FIG. 5 is a flowchart illustrating the detailed processes related to a display of the object blur component in the step S304 in FIG. 3. A method for displaying the rectangular area 426 will now be explained with reference to FIG. 5. A reference position in FIG. 5 means an object position on the image capturing plane just after the SW1 is pressed.

In the step S501, the CPU 103 as an object position calculating unit calculates a current object position on the image capturing plane (hereinafter referred to as an "object position") by using the image processor 106. In the step S502, the CPU 103 calculates a difference value between the reference position and the object position by using the image processor 106 and determines whether the difference value is equal to or larger than a threshold or not. Where the difference value is equal to or larger than the threshold ("true" in the step S502), the process proceeds to the step S503. Where the difference value is smaller than the threshold ("false" in the step S502), the process ends without moving the rectangular area 426.

In the step S503, the CPU 103 determines whether the difference value is equal to or larger than a predetermined maximum moving amount or not by using the image processor 106. Where the difference value equal to or larger than the maximum moving amount ("true" in the step S503), the process proceeds to the step S504 and the display position of the rectangular area 426 is moved by the maximum moving amount. Where the difference value is smaller than the maximum moving amount ("false" in the step S503), the process proceeds to the step S505 and the display position of the rectangular area 426 is moved to the object position.

Finally, in the step S506, the CPU 103 updates the reference position to the moved position of the rectangular area 426 and prepares for processes of the next and succeeding frames.

The above processes can suppress an overreaction of the rectangular area 426 and enables the rectangular area 426 to smoothly move. As a result, even if the user notices a movement of the rectangular area 426 in the follow shot, the present invention can prevent the panning from being negatively affected by the movement of the rectangular area 426 and inform the user of whether the panning is fast or slow.

The processes related to the blur correction according to this embodiment have been explained. The above processes provide the user with an assist effect such that the user can follow the object with a stable image 417. In addition, since the user can simultaneously view the manual blur correction amounts 424 and 425 and the object blur correction amount (rectangular area 426), the user can easily correct panning in the follow shot and utilize this experience for the subsequent image capturing.

Referring back to FIG. 2, in the step S207, the CPU 103 determines whether to transfer to a flow for starting an exposure (image capturing). More specifically, the CPU 103 determines whether the shutter button (operation unit 110) has been fully pressed (hereinafter referred to as SW2). When the SW2 is not pressed ("false" in the step S207), the CPU 103 repeats the processes from the step S203 to the step S206. When the SW2 is pressed ("true" in the step S207), the process proceeds to the step S208.

The step S208 is a process during an exposure period. In the step S208, the CPU 103 performs the processes related to the follow shot assist. The step 209 is a process after the exposure is finished. In the step S209, the CPU 103 develops the captured image by using the image processor 106 and records the image into the recording medium 107.

Figure 6:
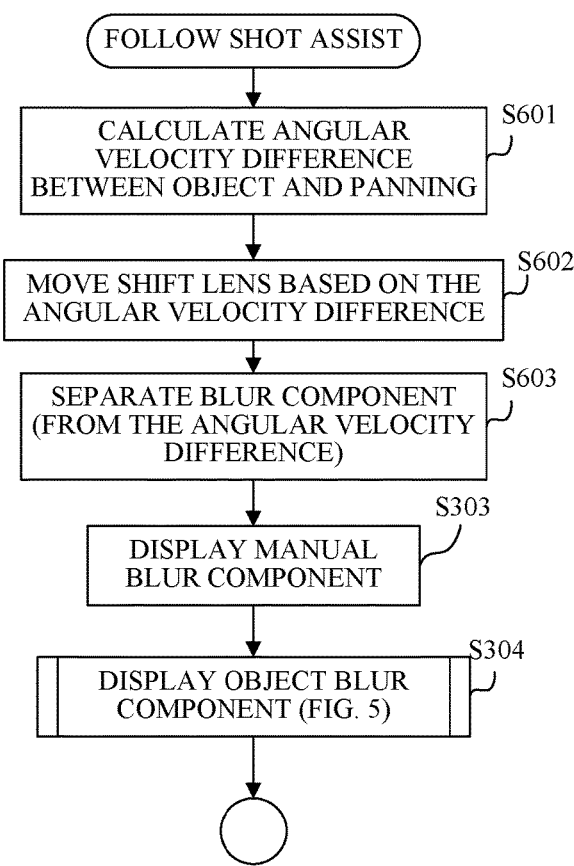
FIG. 6 is a flowchart illustrating a follow shot assist process according to the first embodiment.

FIG. 6 is a detailed flowchart illustrating the processes related to the follow shot assist in the step S208 in FIG. 2. The detailed processes related to the follow shot assist will now be explained with reference to FIG. 6.

In the step S601, the CPU 103 calculates a difference between the angular velocity of the image capturing apparatus 100 detected in the step S203 and the object angular velocity calculated in the step S205 and calculates a correction amount in the follow shot assist. The correction amount in the follow shot assist can also be calculated based on a difference between a variation of the angular velocity of the image capturing apparatus detected in the step S203 per unit time and a variation of the object angular velocity calculated in the step S205 per unit time, that is, an amount obtained by differentiating the difference between these angular velocities by time or may also be calculated based on an amount obtained by integrating the difference between these angular velocities by time.

In the step S602, the CPU 103 moves the shift lens (optical system 101) as a corrector based on the correction amount calculated in the step S601. In other words, the shift lens (optical system 101) is moved so as to suppress the object blur by correcting the difference between the object angular velocity and the panning angular velocity of the image capturing apparatus 100. The above processes enable the follow shot assist.

In the step S603, the CPU 103 applies the LPF to the difference value (correction amount) between the angular velocities calculated in the step S601, and separates it into the manual blur component and the object blur component, by using the image processor 106.

In the step S303 in FIG. 6, the CPU 103 displays the correction amount specified as the manual blur component on the display unit 109 as with the case of the step S303 in FIG. 3. In the step S304 in FIG. 6, the CPU 103 displays the correction amount specified as the object blur component on the display unit 109 as with the case of the step S304 in FIG. 3. The processes of the steps S303 and S304 in FIG. 6 are basically the same as those of the steps of S303 and S304 in FIG. 3 and thus the explanation of these steps is omitted.

The above processes in the follow shot assist can provide the displays in the main image capturing similar to those in the preliminary action.

This is the details of the follow shot assist process.

Now, referring back to FIGS. 4A and 4B, the display in the follow shot assist mode will be concretely explained.

Reference numeral 403 illustrates an exposure period after the SW2 is pressed and the process of the step S208 in FIG. 2 is performed during this exposure period 403. Reference numeral 404 illustrates a period after the exposure ends and the process of S209 in FIG. 2 is performed during this period 404.

Firstly, the display in the conventional follow shot assist mode will be explained with reference to FIG. 4A. As explained for reference numeral 408, the object position is not stable due to the manual blur or the object blur. The follow shot assist is corrected on the basis of the angle of field 409 obtained when the SW2 is pressed. When the object angular velocity is not equal to the panning velocity of the image capturing apparatus 100, the objects blurs. Then, the shift lens 406 is moved as illustrated by reference numeral 410 so as to suppress the object blur and the manual blur. During the exposure period 403, the correction with the shift lens 406 can stabilize the object position on the image capturing plane as illustrated by reference numeral 411. A final image is affected by the manual blur or the object blur during the preliminary action period 402, and has a different angle of view 412 from that of the target image 401.

With the above problem in mind, displays in the follow shot assist mode according to this embodiment will be explained with reference to FIG. 4B. A display illustrated by reference numeral 423 may be provided during the exposure period as with the case of the preliminary action period. Alternatively, another illustrative display illustrated by reference numeral 427 will be explained.

During the exposure period 403, the correction with the shift lens 406 stabilize the object position on the image capturing plane as illustrated by reference numeral 411. Thus, the display area on the image capturing plane is not changed and the position of the rectangular area 426 is fixed after the SW2 is pressed. During the exposure period 403, a new image to be displayed cannot be acquired. Thus, a display position of the image acquired just before the SW2 is pressed is moved by the object blur correction amount as illustrated by reference numeral 428.

The manual blur correction amount is displayed as with the display 423, by moving the marks 424 and 425 on the peripheral part of the display unit 109, prevents the panning from being negatively affected, and informs the user of whether the panning is fast or slow.

As a result, the target image 413 is included in the angle of field of the whole image 429 and an image corresponding to the target image 413 can be acquired by a post-process.

In the step S209 in FIG. 2, the CPU 103 may record a developed image as it is in the recording medium 107, or cut and record an area corresponding to the target image 413 in the recording medium 107, by using the image processor 106. The above processes enable the display to support the user during the main image capturing period in the follow shot assist as well as during the preliminary action period 402.

This is the processes of the follow shot assist mode according to this embodiment. The above processes enable the user to stably follow the object in an image and to obtain information on the manual blur and the panning delay through the whole follow shot assist mode. Thereby, the above processes can provide more effective follow shot assist.

While this embodiment corrects an imaging position of the object is corrected by moving the shift lens (optical system 101), the present invention is not limited to this embodiment and may shift the image sensor 102. While this embodiment displays both the manual blur and the object blur, the present invention is not limited to this embodiment and may display only one of the manual blur and the object blur.

Second Embodiment

Figure 7:
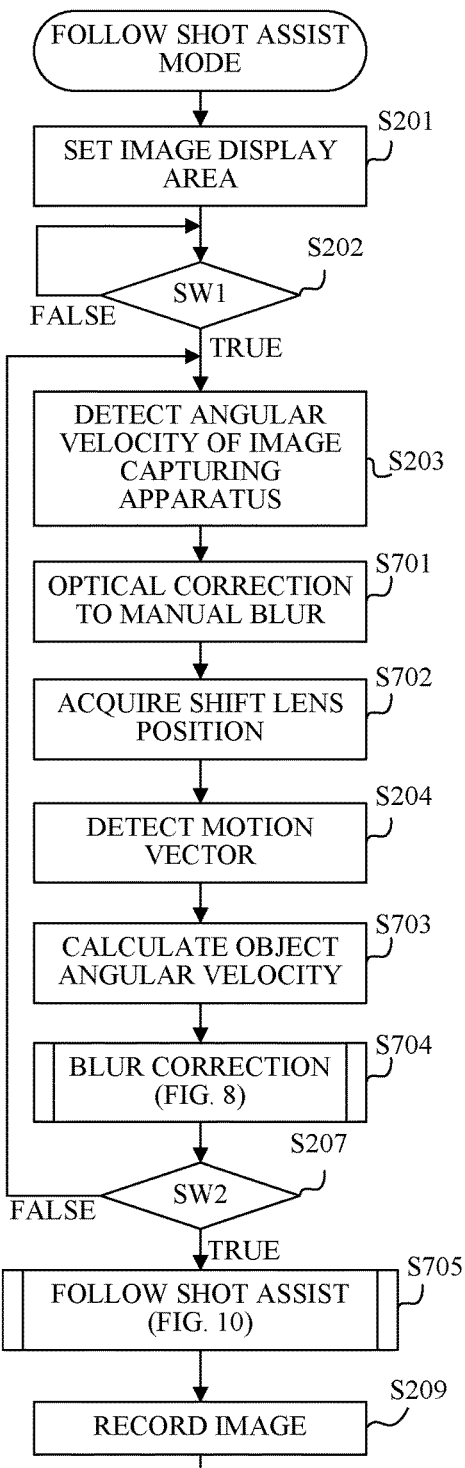
FIG. 7 is a general flowchart of a follow shot assist according to the second embodiment.

The block diagram in FIG. 1 also illustrates a basic configuration of an image capturing apparatus 100 as an example of an image stabilization apparatus according to a second embodiment. FIG. 1 has been already explained in the first embodiment, and a description thereof will be omitted. FIG. 7 is a flowchart of the follow shot assist mode according to the second embodiment of the present invention.

The steps S201-S204 and S701-S704 are the processes during the preliminary action period before the main image capturing. The processes of the steps S201-S203 are the same as those of the steps S201-S203 in FIG. 2, and thus the description thereof will be omitted. In the step S701, the CPU 103 applies a high-pass filter (hereinafter referred to as a "HPF") as an extracting unit to the angular velocity of the image capturing apparatus 100 detected in the step S203 and extracts the manual blur component. Then, the CPU 103 corrects the manual blur by moving the shift lens (optical system 101) based on the manual blur component.

In the step S702, the CPU 103 as a position detecting unit detects a position of the shift lens (optical system 101) moved in the step S701. Then, the CPU 103 converts a displacement amount of the detected shift lens position into a movement amount on the image capturing plane. The process of S204 is the same as that of S204 in FIG. 2, and a description thereof will be omitted.

In the step S703, the CPU 103 specifies an object vector based on the angular velocity of the image capturing apparatus 100 detected in the step S203 and the motion vector converted into the movement amount on the image capturing plane in the step S204. The CPU 103 calculates an object angular velocity based on the position of the shift lens (optical system 101) detected in the step S702. The CPU 103 can calculate the object angular velocity by adding a shift amount of the object vector and the correction amount of the shift lens (optical system 101) to the angular velocity of the image capturing apparatus 100.

In the step S704, the CPU 103 corrects blurs by using the image processor 106 as with the step S206 in FIG. 2, and displays the correction result and the correction amount on the display unit 109. The process of the step S704 in FIG. 7 relates to the blur correction according to this second embodiment. A detailed process of the step S704 will now be explained with reference to FIGS. 8, 9A, 9B, and 10.

Figure 8:
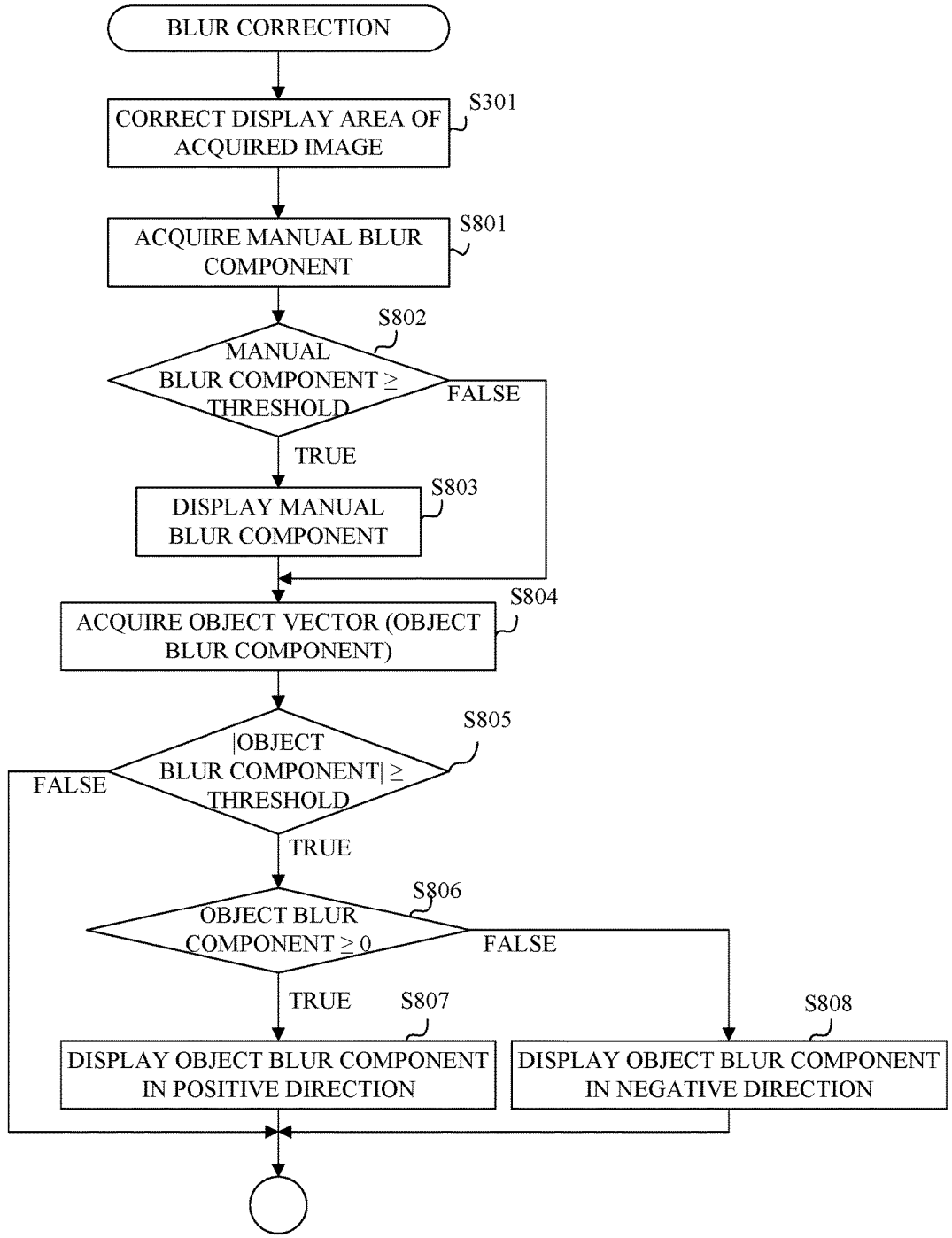
FIG. 8 is a detailed flowchart illustrating a blur correction according to the second embodiment.

FIG. 8 is a detailed flowchart illustrating the blur correction according to the second embodiment of the present invention. A detailed description of a characteristic blur correction according to this embodiment will be given with reference to FIG. 8.

The process of the step S301 is the same as that of the step S301 in FIG. 3, and a description thereof will be omitted. In the step S801, the CPU 103 acquires the manual blur component calculated in the step S701 in FIG. 7. In the step S802, the CPU 103 determines whether the manual blur component acquired in the step S801 is equal to or larger than a predetermined threshold.

Where the manual blur component is equal to or larger than a predetermined threshold ("true" in the step S802), the process proceeds to the step S803 and the display unit 109 displays that the manual blur component is equal to or larger than the predetermined threshold. Where the manual blur component is smaller than the predetermined threshold ("false" in the step S802), the process skips the step S803 and proceeds to the step S804.

In the step S804, the CPU 103 acquires the object blur component based on the blur vector. In this embodiment, the object vector is equivalent to the object blur component because the manual blur component is suppressed by driving the shift lens (optical system 101) in the step S701 in FIG. 7.

In the step S805, the CPU 103 determines whether the object blur component is equal to or larger than a predetermined threshold or not. Where the object blur component is equal to or larger than the predetermined threshold ("true" in the step S805), the process proceeds to the determination in the step S806. In the case that the object blur component is smaller than the predetermined threshold ("false" in the step S805), the process skips the subsequent steps and ends.

In the step S806, the CPU 103 determines a moving direction of the object blur component. Where the moving direction is positive ("true" in the step S806), the process proceeds to the step S807 and the display unit 109 displays that the object blur occurs in the positive direction.

Where the moving direction is negative ("false" in the step S806), the process proceeds to the step S808 and the display unit 109 displays that the object blur occurs in the negative direction. Thus, in the blur correction, the CPU 103 corrects the blurs by moving the display area on the image capturing plane, separates the blur components into information on the manual blur component and the object blur component, and displays the information on the display unit 109.

Figure 9A:
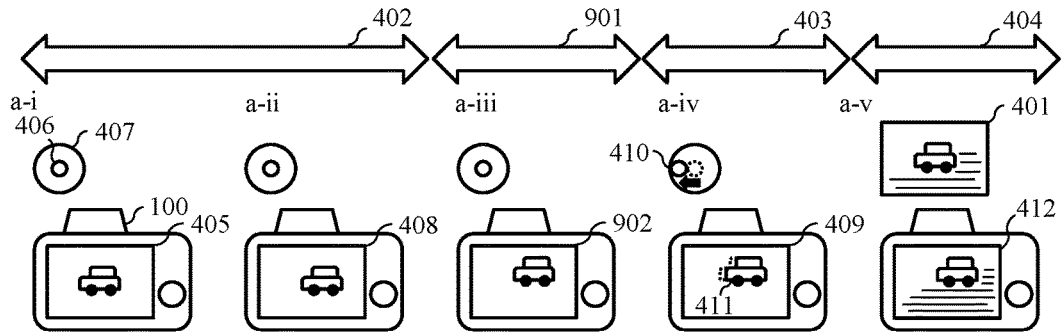
FIGS. 9A and 9B illustrate displays in a follow shot assist according to the second embodiment.
Figure 9B:
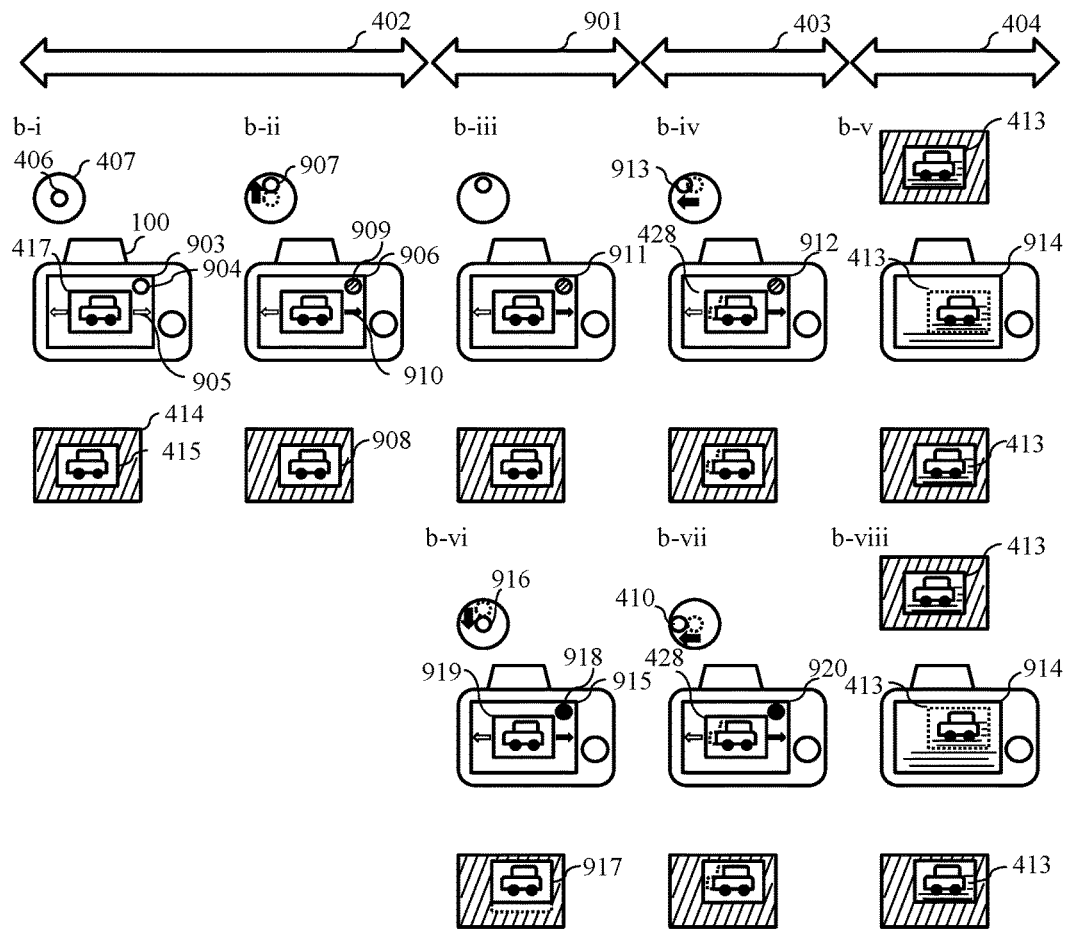

FIGS. 9A and 9B are views which illustrate a concrete display in the follow shot assist mode according to this embodiment. The concrete description of displays in the follow shot assist mode according to this embodiment will now be given with reference to FIGS. 9A and 9B.

FIG. 9A illustrates displays in the conventional follow shot assist mode and FIG. 9B illustrates displays in the follow shot assist mode according to the second embodiment of the present invention. Reference numerals 401 to 408 in FIG. 9A are the same as those in FIG. 4A, and a description thereof will be omitted.

In the conventional follow shot assist mode, the object position is not stable in an angle of field, so that it is difficult to follow the object. With this problem in mind, a description will be given of displays in the follow shot assist mode according to this embodiment with reference to FIG. 9B. Reference numerals 413 to 415, 417 and 418 in FIG. 9B are the same as those in FIG. 4B, and a description thereof will be omitted.

Reference numeral 903 illustrates, as with Reference numeral 416 in FIG. 4B, a basic display in the follow shot assist mode according to this embodiment and it is displayed in the step S201 in FIG. 7. Reference numeral 906 illustrates, as with reference numeral 423 in FIG. 4B, a blur correcting display according to this embodiment and it is displayed in the step S704 in FIG. 7.

An area 904 illustrates whether the manual blur is equal to or larger than the predetermined threshold or not. Where the manual blur is smaller than the predetermined threshold, the area blacks out. Where the manual blur is equal to or larger than the predetermined threshold, the area is flickered as illustrated by reference numeral 909 to inform the user of a large manual blur amount. Areas 905 illustrate the object blur correction amounts by lighting up the area corresponding to the object blur direction, as illustrated by reference numeral 910. Reference numeral 907 illustrates driving of the shift lens 406 for the manual blur correction and this manual blur correction causes the display area 908 to be displayed on the image capturing plane in which the manual blur is suppressed.

Where the manual blur correction amount is equal to or larger than the predetermined threshold, the area 904 is flickered as illustrated by reference numeral 909 to inform the user of a large manual blur amount. This is the processes related to the characteristic blur correction according to this embodiment.

The above processes provide the user with an assist effect such that the user can follow the object with the stable image 417. Moreover, a blur amount that does not affect actual image capturing is not displayed so as to limit an information amount to be displayed, and to prevent the panning by the user from being negatively affected.

Referring back to FIG. 7, the step S207 is the same as the step S207 in FIG. 2 and a description thereof will be omitted.

The step S705 is a process during an exposure period. In the step S705, the CPU 103 performs the follow shot assist process. A process in the step S209 is the same that in the step S209 in FIG. 2, and a description thereof will be omitted.

Figure 10:
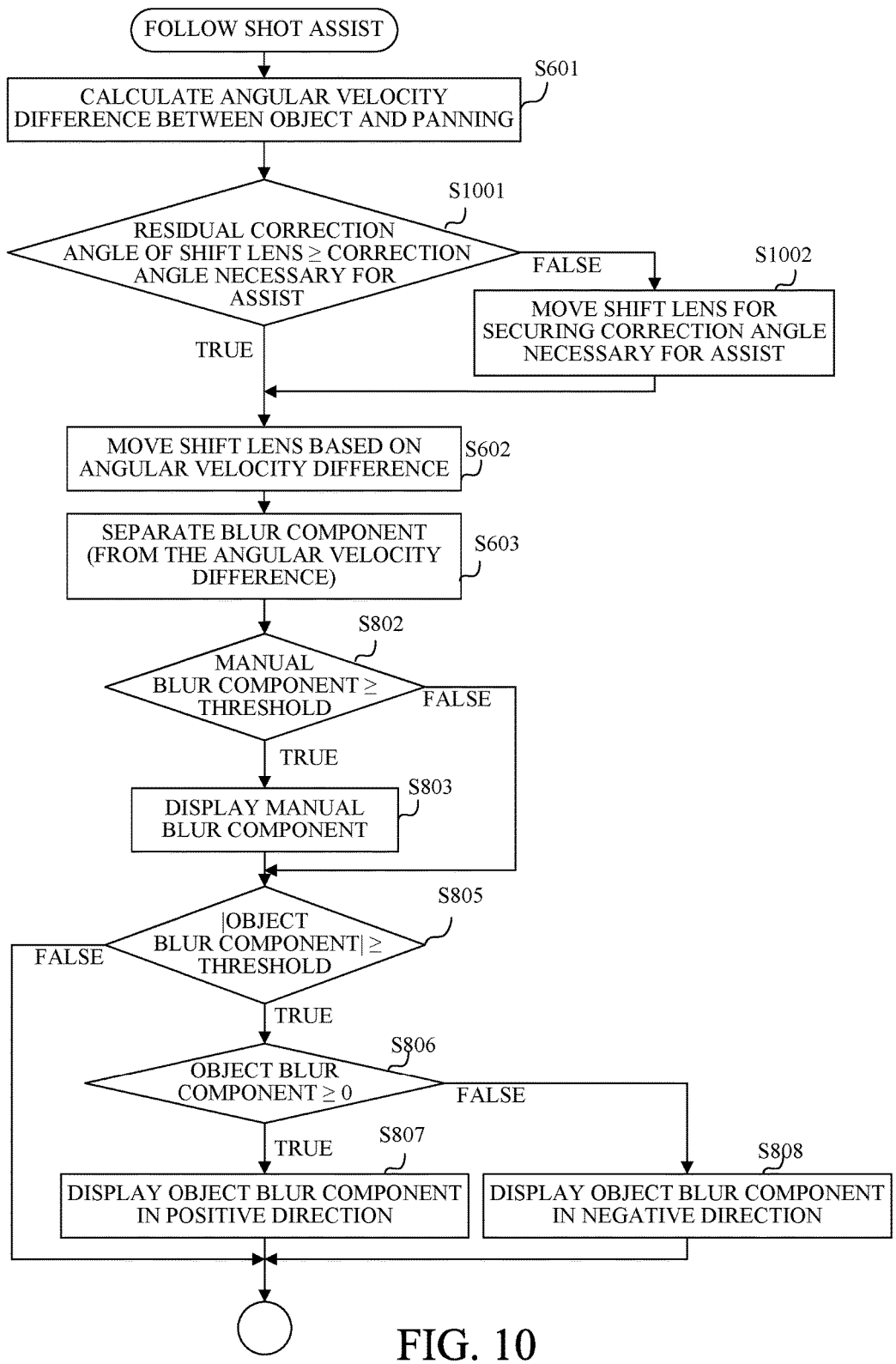
FIG. 10 is a flowchart illustrating a follow shot assist process according to the second embodiment.

FIG. 10 is a detailed flowchart illustrating the follow shot assist process in the step S705 in FIG. 7. The detailed processes will now be explained with reference to FIG. 10.

The step S601 is the same as the step S601 in FIG. 6, and a description thereof will be omitted. In the step S1001, the CPU 103 determines whether or not a residual correction angle of the shift lens (optical system 101) satisfies a necessary correction angle for the follow shot assist. Where the correction angle is sufficient ("true" in the step S1001), the process proceeds to the step S602. Where the correction angle is insufficient ("false" in the step S1001), the process proceeds to the step S1002 and the shift lens (optical system 101) is moved to a position where the correction angle can be secured.

The object position on the image capturing plane is changed between before and after the movement of the shift lens (optical system 101) since the shift lens (optical system 101) is moves to the position where the correction angle can be secured. However, the object can be located at the angle of field by previously restricting the image area 417 illustrated in FIG. 9B or a movable range 407 of the shift lens 406.

The processes in the steps S602 and S603 are the same as those in the steps S602 and S603 in FIG. 6, and a description thereof will be omitted. The processes in the steps S802 to S808 are the same as those in the steps S802 to S808 in FIG. 8, and a description thereof will be omitted. According to the above processes, the display in the follow shot assist can be performed during the main image capturing period as well as during the preliminary action period.

This is the detailed explanation of the follow shot assist process.

Referring back to FIGS. 9A and 9B, the detailed follow shot assist mode according to this embodiment will be explained.

Reference numeral 901 illustrates a period after the SW2 is pressed just before an exposure starts. The processes in the steps S1001 and S1002 in FIG. 10 are performed during this period 901.

Reference numerals 403 and 404 are the same as those in FIG. 4A, and a description thereof will be omitted. Reference numerals 409 to 412 are the same as those in FIG. 4A and reference numeral 902 merely illustrates a display during the period 901 after the SW2 is pressed just before the exposure starts. This is the explanation of FIG. 9A.

A display in the follow shot assist mode according to this embodiment will be explained with reference to FIG. 9B. A display 911 is provided where it is determined that the correction angle is sufficient in the step S1001 in FIG. 10, and is basically the same as the display 906.

A display 912 is basically the same as the display 906, and an image just before the SW2 is pressed is continuously displayed during the exposure period 403, since an image cannot be newly acquired during the exposure period 403. Then, the shift lens 406 is moved from the position 907 after the manual blur is corrected as illustrated by reference numeral 913, so as to suppress the object blur and the manual blur.

As a result, the target image 413 is included in the angle of field of the whole image 914 and an image corresponding to the target image 413 can be acquired by a post-process. This is the display where it is determined that the correction angle is sufficient.

The display when it is determined that the correction angle is insufficient will be indicated.

A display 915 is provided where it is determined that the correction angle is insufficient in the step S1001 in FIG. 10. The shift lens 406 moves to a direction for securing the correction angle through the step S1002 in FIG. 10, as illustrated by reference numeral 916. As a result, an object position on the image capturing plane moves as illustrated by reference numeral 917. In order to denote that the shift lens 406 was moved, the area illustrated by reference numeral 904 is lit up as illustrated by reference numeral 918. An area 919 continuously displays the image just before the SW2 is pressed, so that the user does not notice a movement of the object position on the image capturing plane.

A display 920 is almost the same as the display 915, and a description thereof will be omitted. Thus, the explanation of reference numeral 915 is omitted. The target image 413 is finally included in the angle of field of the whole image 914 and an image corresponding to the target image 413 can be acquired by a post-process. This is the display where it is determined that the correction angle is insufficient. The above processes provide the supportive display to the user in the manual blur correction with the shift lens (optical system 101) during the main image capturing period in the follow shot assist as well as during the preliminary action period 402.

This is the processes of the follow shot assist mode according to this embodiment. The above processes enable the user to stably follow the object in an image and to obtain information such as the manual blur, the delay of the panning, and the drive of the shift lens (optical system 101) through the whole follow shot assist mode. Thereby, the above processes can provide a more effective follow shot assist.

While this embodiment corrects the imaging position of the object by moving the shift lens (optical system 101), the present invention is not limited to this embodiment and may shift the image sensor 102. In addition, while this embodiment displays both the manual blur and the object blur, the present invention is not limited to this embodiment and may display only one of the manual blur and the object blur.

While this embodiment lights off, flickers and lights on the manual blur and the object blur, these may be displayed by using differences in color.

Each of the above embodiments can operate a corrector for the manual blur and object blur in the follow shot assist mode, and provide a user with an assist effect such that the user can follow the object with a stable image.

In addition, the present invention can provide a higher assist effect by showing the user the correction amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-092724, filed on May 2, 2016, which is hereby incorporated by reference herein in its entirety.

What is claimed is:

1. An image processing apparatus which causes a display unit to display a still image captured by an image capturing apparatus that includes the display unit, the image processing apparatus comprising:
   one or more processors; and
   a memory storing instructions which, when executed by the one or more processors, cause the one or more processors to:
   perform a control so as to extract an area for a main object from an image captured by the image capturing apparatus and display the extracted area;
   calculate information on a motion of the main object based on a blur detected by a first detector which detects the blur of the image capturing apparatus and a motion vector detected by a second detector which detects the motion vector from the image; and
   control an optical correction unit provided in the image capturing apparatus based on a motion vector indicating the information on the motion of the main object during capturing the still image,
   wherein the one or more processors change the area, which is displayed on the display unit, for the main object based on the motion vector indicating the information on the motion of the main object before the still image is captured.

2. The image processing apparatus according to claim 1, wherein the image is an image to be displayed on the display unit and is captured by the image capturing apparatus which follows main object which is moving through panning.

3. The image processing apparatus according to claim 1, wherein the memory stores instructions which, when executed by the one or more processors, cause the one or more processors separate the motion of the main object into an object blur component and a manual blur component.

4. The image processing apparatus according to claim 3, wherein the one or more processors control the display unit so as to display at least one correction amount of the object blur component or the manual blur component during the panning.

5. The image processing apparatus according to claim 3, wherein the one or more processors include a low-pass filter.

6. The image processing apparatus according to claim 4, wherein the correction amount to the manual blur component is represented by an increase or decrease of a gauge or a movement of a mark in the gauge on the display unit.

7. The image processing apparatus according to claim 4, wherein the correction amount to the object blur component is represented by a shift of a rectangular area on the display unit.

8. The image processing apparatus according to claim 4, wherein the display unit displays a flickering area when the manual blur component is equal to or larger than a threshold.

9. The image processing apparatus according to claim 4, wherein the display unit displays information which shows that an object blur occurs in a positive direction when an absolute value of the object blur component is equal to or larger than a threshold and the object blur component is equal to or larger than zero, and
   wherein the display unit displays information which shows that the object blur occurs in a negative direction when the absolute value of the object blur component is equal to or larger than the third threshold and the object blur component is smaller than zero.

10. The image processing apparatus according to claim 1, wherein the memory stores instructions which, when executed by the one or more processors, cause the one or more processors to calculate a position of the main object, and
    wherein the one or more processors are configured to:
    move the extracted area by a predetermined maximum moving amount when a difference between a current position of the main object and a position of the main object a predetermined time before is equal to or larger than the predetermined maximum moving amount, which is equal to or larger than a threshold,
    move the extracted area to a position at which a current main object can be extracted when the difference is equal to or larger than the threshold and is smaller than the predetermined maximum moving amount, and
    maintain the extracted area when the difference is smaller than the threshold.

11. The image processing apparatus according to claim 1, wherein the extracted area of the main object displayed on the display unit contains the main object in the image captured by the image capturing apparatus.

12. The image processing apparatus according to claim 1, wherein the memory stores instructions which, when executed by the one or more processors, cause the one or more processors to extract a manual blur component from the blur of the image capturing apparatus, wherein the one or more processors perform a control to drive a corrector in the image capturing apparatus based on the blur of the image capturing apparatus and a correction amount calculated based on the motion of the main object when the still image is captured, wherein the one or more processors perform a control to drive the corrector using the manual blur component extracted before the image is captured, wherein the one or more processors include a high-pass filter, and wherein the corrector includes a shift lens or an image sensor.

13. The image processing apparatus according to claim 1, wherein the one or more processors perform a control to drive a corrector in the image capturing apparatus based on the blur of the image capturing apparatus and a correction amount calculated based on the motion of the main object when the still image is captured, and wherein the corrector includes a shift lens or an image sensor.

14. An image capturing apparatus comprising:
an image sensor configured to capture an image of an object;
a display unit configured to display the image; and
the image processing apparatus according to claim 1.

15. The image processing apparatus according to claim 1, wherein the one or more processors include an electronic corrector and use the electronic corrector to change the area for the main object based on the motion vector indicating the information on the motion of the main object before the still image is captured.

16. The image processing apparatus according to claim 15, wherein the electronic corrector is a unit for correcting a hand jiggle.

17. A control method of an image processing apparatus and which causes a display unit to display a still image captured by an image capturing apparatus that includes the display unit, the control method comprising:

a control step of performing a control so as to extract an area for a main object from an image captured by the image capturing apparatus and display the extracted area;

a calculating step of calculating information on a motion of the main object based on a blur of the image capturing apparatus and a motion vector detected from the image; and a correction control step of controlling the image capturing apparatus based on a motion vector indicating the information on the motion of the main object during capturing the still image, wherein in the control step, the area, which is displayed on the display unit, for the main object is changed based on the motion vector indicating the information on the motion of the main object before the still image is captured.

18. A non-transitory recording medium which stores a program configured to enable a computer to execute a control method of an image processing apparatus which causes a display unit to display a still image captured by an image capturing apparatus that includes the display unit, the control method comprising:

a control step of performing a control so as to extract an area for a main object from an image captured by the image capturing apparatus display the extracted area;

a calculating step of calculating information on a motion of the main object based on a blur of the image capturing apparatus and a motion vector detected from the image; and a correction control step of controlling the image capturing apparatus based on a motion vector indicating the information on the motion of the main object during capturing still image, wherein in the control step, the area, which is display on the display unit, for the main object is changed based on the motion vector indicating the information on the motion of the main object before the still image is captured.

* * * * *